United States Patent [19]

Yamaki

[11] Patent Number: 5,179,531
[45] Date of Patent: Jan. 12, 1993

[54] ACCELERATED DIGITAL SIGNAL PROCESSOR

[75] Inventor: Makio Yamaki, Tokyo, Japan

[73] Assignee: Pioneer Electronic Corporation, Tokyo, Japan

[21] Appl. No.: 844,991

[22] Filed: Mar. 2, 1992

Related U.S. Application Data

[63] Continuation of Ser. No. 596,527, Oct. 12, 1990, abandoned.

[30] Foreign Application Priority Data

Apr. 27, 1990 [JP] Japan .................................. 2-112745
Apr. 27, 1990 [JP] Japan .................................. 2-112746

[51] Int. Cl.$^5$ .............................................. G06F 7/38
[52] U.S. Cl. .................................................. 364/736
[58] Field of Search ...................... 364/736, 748, 754

[56] References Cited

U.S. PATENT DOCUMENTS

| | | | |
|---|---|---|---|
| 4,594,655 | 6/1986 | Hao et al. | 364/736 X |
| 4,680,727 | 7/1987 | White | 364/754 |
| 4,760,544 | 7/1988 | Lamb | 364/736 |
| 4,849,882 | 7/1989 | Aoyama et al. | 364/736 X |
| 4,872,131 | 10/1989 | Kubota et al. | 364/736 |
| 4,901,267 | 2/1990 | Birman et al. | 364/736 |
| 4,916,651 | 4/1990 | Gill et al. | 364/736 |
| 4,949,292 | 8/1990 | Hoshino et al. | 364/736 |
| 4,996,661 | 2/1991 | Cox et al. | 364/748 |

FOREIGN PATENT DOCUMENTS

0247383 2/1987 European Pat. Off. .

*Primary Examiner*—Tan V. Mai
*Attorney, Agent, or Firm*—Perman & Green

[57] ABSTRACT

There is provided a digital signal processor having first and second arithmetic operating sections each having a digital multiplier for multiplying values of two digital signal data and a digital accumulator for accumulating an output value of the multiplier, wherein an output of the multiplier in the second arithmetic operating section is connected to one input of the digital signal data of the multiplier in the first arithmetic operating section. There is also provided a digital signal processor in which the output of the multiplier in the second arithmetic operating section is connected to one input of each of both of the multipliers in the first and second arithmetic operating sections, respectively. Thus, the processing time can be reduced in the case of an arithmetic operation such that a plurality of coefficients are multiplied to a signal data value or an approximate value calculation.

2 Claims, 4 Drawing Sheets

PRIOR ART

Fig. 4

| STEP | CALCULATION OF MULTIPLIER 18 | CALCULATION OF MULTIPLIER 13 | CALCULATION OF ALU 14 |
|---|---|---|---|
| 1 | $X \cdot X$ | $C_1 \cdot X$ | — |
| 2 | $X \cdot X^2$ | $C_2 \cdot X^2$ | $C_1 \cdot X$ |
| 3 | $X \cdot X^3$ | $C_3 \cdot X^3$ | $C_1 \cdot X + C_2 \cdot X^2$ |
| 4 | — | $C_4 \cdot X^4$ | $C_1 \cdot X + C_2 \cdot X^2 + C_3 \cdot X^3$ |
| 5 | — | — | $C_1 \cdot X + C_2 \cdot X^2 + C_3 \cdot X^3 + C_4 \cdot X^4$ |
| 6 | — | — | $C_0 + C_1 \cdot X + C_2 \cdot X^2 + C_3 \cdot X^3 + C_4 \cdot X^4$ |

ACCELERATED DIGITAL SIGNAL PROCESSOR

This is a continuation of copending application Ser. No. 07/596,527 filed on Oct. 12, 1990 now abandoned.

BACKGROUND OF THE INVENTION

1. Field of the Invention

The present invention relates to a digital signal processor (hereinafter, referred to as a DSP).

2. Description of the Related Art

There has been well known an audio signal processing apparatus for executing signal processes for a sound field control to audio signals so as to give presence in a home or vehicle by producing a sound field which is obtained by simultaing the sound field in an acoustic space of a concert hall or a theater. For instance, such an apparatus has been disclosed in JP-A-64-72615. Such an audio signal processing apparatus has a DSP to execute a sound field control by digital operation processing the audio signals which were output from an audio signal source such as a tuner or the like. The DSP has: an operating section to execute operating processes such as four arithmetical operations or the like; and memories such as data RAM to store digital audio signal data to be supplied to the operating section, a coefficient RAM to store digital coefficient signal data (hereinafter, simply referred to as coefficient data) which is multiplied to the audio signal data, and the like. In the DSP, the signal data is transferred among the memories and from the memories to the operating section and operating processes of the signal data can be repetitively executed at a high speed in accordance with predetermined programs. On the other hand, the programs have been written in a writable program memory such as an RAM or the like in the DSP. Each time a sound field mode is switched by a switching operation, the program is changed by a microcomputer provided on the outside of the DSP. That is, every acoustic space can be produced by changing the program.

As shown in FIG. 1, the conventional DSP comprises buffer memories 1 and 2, a multiplier 3, an ALU 4, and an accumulator 5. On the other hand, the DSP also has a signal data RAM 6 to store input digital signal data and a coefficient data RAM 7 to store a plurality of coefficient data. Upon operation, the signal data is read out of the signal data RAM 6 and is supplied and held into the buffer memory 1 through a bus 8. The coefficient data is sequentially read out of the coefficient data RAM 7 at predetermined timings and suupplied and held into the buffer memory 2. Values which are indicated by the data held in the buffer memories 1 and 2 are multiplied by the multiplier 3. The result of the multiplication by the multiplier 3 is added to a value held in the accumulator 5 by the ALU 4 and the resultant addition data is held in the accumulator 5. The ALU 4 and accumulator 5 form accumulating means. The output terminal of the accumulator 5 is connected to the buffer memory 1 and the signal data RAM 6 through the bus 8 and therefore the data held in the accumulator 5 is transferred to the buffer memory 1 or the signal data RAM 6 via the bus 8.

There is a case where an arithmetic operation $$\sum_{n=1}^{n} a_n \cdot b_n \cdot x_n$$

in which two coefficient data values are multiplied to the signal data value and the multiplication results are accumulated is performed by using such a conventional DSP. $a_n$ denotes a coefficient which changes in accordance with the progress of the program. $b_n$ indicates a fixed coefficient. In this case, $a_1 \cdot x_1$ is first calculated by the multiplier 3. The result of the calculation $a_1 \cdot x_1$ is transferred to the buffer memory 1 via the ALU 4, accumulator 5, and bus 8 and $a_1 \cdot x_1 \cdot b_1$ is calculated by the multiplier 3. At this time, the ALU 4 executes an operation such that 0 is added to the result of the multiplication by the multiplier 3. The calculated result $a_1 \cdot b_1 \cdot x_1$ is held in the accumulator 5. Then, $a_2 \cdot x_2$ is calculated by the multiplier 3. The calculated result $a_2 \cdot x_2$ is transferred to the buffer memoroy 1 via the ALU 4, accumulator 5, and bus 8. $a_2 \cdot x_2 \cdot b_2$ is calculated by the multiplier 3. The value of $a_1 \cdot b_1 \cdot x_1$ held in the accumulator 5 and the value of the calculated $a_2 \cdot b_2 \cdot x_2$ are added by the ALU 4 and the addition result is held in the accumulator 5. By repeating the above operations, $$\sum_{n=1}^{n} a_n \cdot b_n \cdot x_n$$

is calculated.

However, in such a conventional DSP, in the case of the arithmetic operation such as $$\sum_{n=1}^{n} a_n \cdot b_n \cdot x_n$$

in which a plurality of coefficients are multiplied to the signal data value, there are problems such that the number of steps of the program is large and it takes a long processing time.

On the other hand, there is a case where it is desired to calculate an approximate value in the DSP by using, for instance, $$\sum_{n=0}^{n} c_n \cdot x^n$$

as an approximate equation of a non-linear functon. $C_n$ denotes coefficient data and x indicates signal data. However, such DSP in which only the coefficient data is supplied to the buffer memory 2 as shown in FIG. 1, cannot calculate the power of the signal data value x by the multiplier 3 and cannot obviously calculate $$\sum_{n=0}^{n} c_n \cdot x^n.$$

The approximate value can be calculated by constructing in such a manner that the buffer memory 2 is connected to the bus 8 and the signal data from the signal data RAM 6 is supplied to the buffer memories 1 and 2 and the power of the signal data value x can be calculated by the multiplier 3.

However, it is necessary to hold the result of the calculation by the multiplier 3 into the accumulator and to transfer to the buffer memory 1 or 2 through the bus 8. For instance, to calculate $c_2 \cdot x^2$, after $x^2$ was multiplied by the multiplier 3, the value of the multiplication result is supplied and held into the accumulataor 5 via the ALU 4 and transferred to the buffer memory 1 through the bus 8 and, thereafter, $c_2$ and $x^2$ are multiplied. Therefore, new multiplication and accumulation cannot be performed until the data is transferred and there are problems such that the number of steps of the program increases and it takes a long processing time.

SUMMARY OF THE INVENTION

It is an object of the invention to provide a DSP which can reduce a processing time in the case of an arithmetic operation to multiply a plurality of coefficients to a signal data value and a calculation of an approximate value.

According to a DSP of the invention, there is provided a digital signal processor having first and second arithmetic operating sections each comprising: digital multiplying means for multiplying values of two digital signal data; and digital accumulating means for accumulating an output value of the multiplying means, wherein the output of the multiplying means in the second arithmetic operating section is connected to one input of the digital signal data of the multiplying means in the first arithmetic operating section.

On the other hand, according to a DSP of the invention, there is provided a digital signal processor having first and second arithmetic operating sections each comprising: digital multiplying means for multiplying values of two digital signal data; and digital accumulating means for accumulating an output value of the multiplying means, wherein the output of the multiplying means in the second arithmetic operating section is connected to one input of each of both of the multiplying means in the first and second arithmetic operating sections.

BRIEF DESCRIPTION OF THE DRAWINGS

FIG. 4 is a diagram showing a progressing state of the calculation of an approximate value.

DETAILED DESCRIPTION OF PREFERRED EMBODIMENTS

Figure 1:
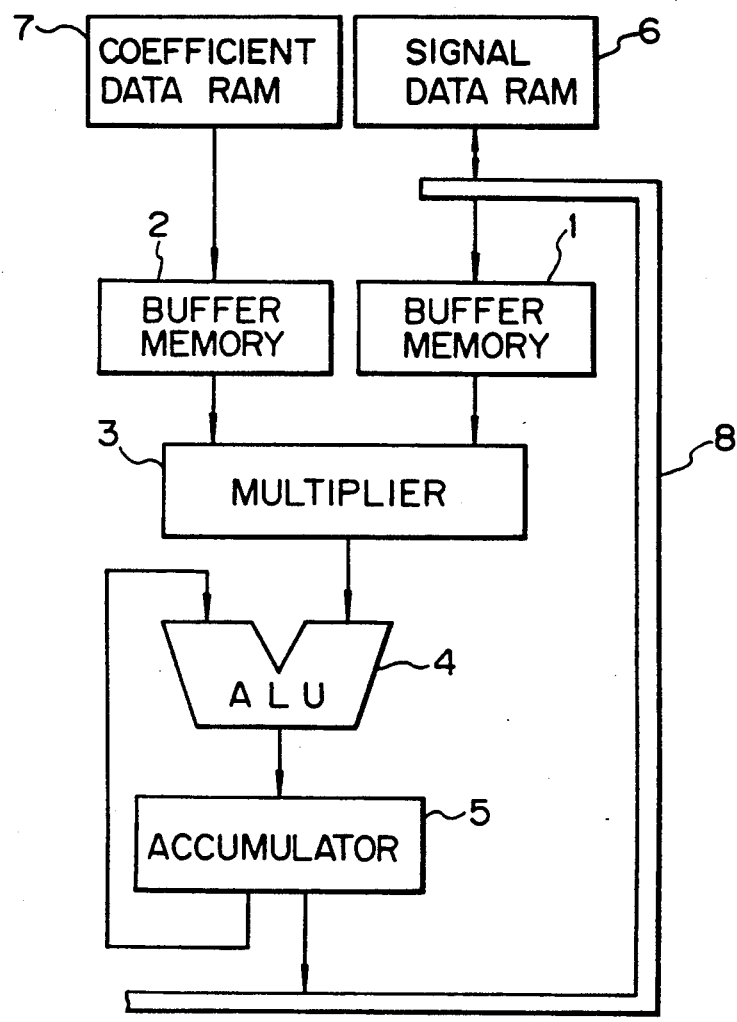
FIG. 1 is a diagram showing a construction of a conventional DSP.
Figure 2:
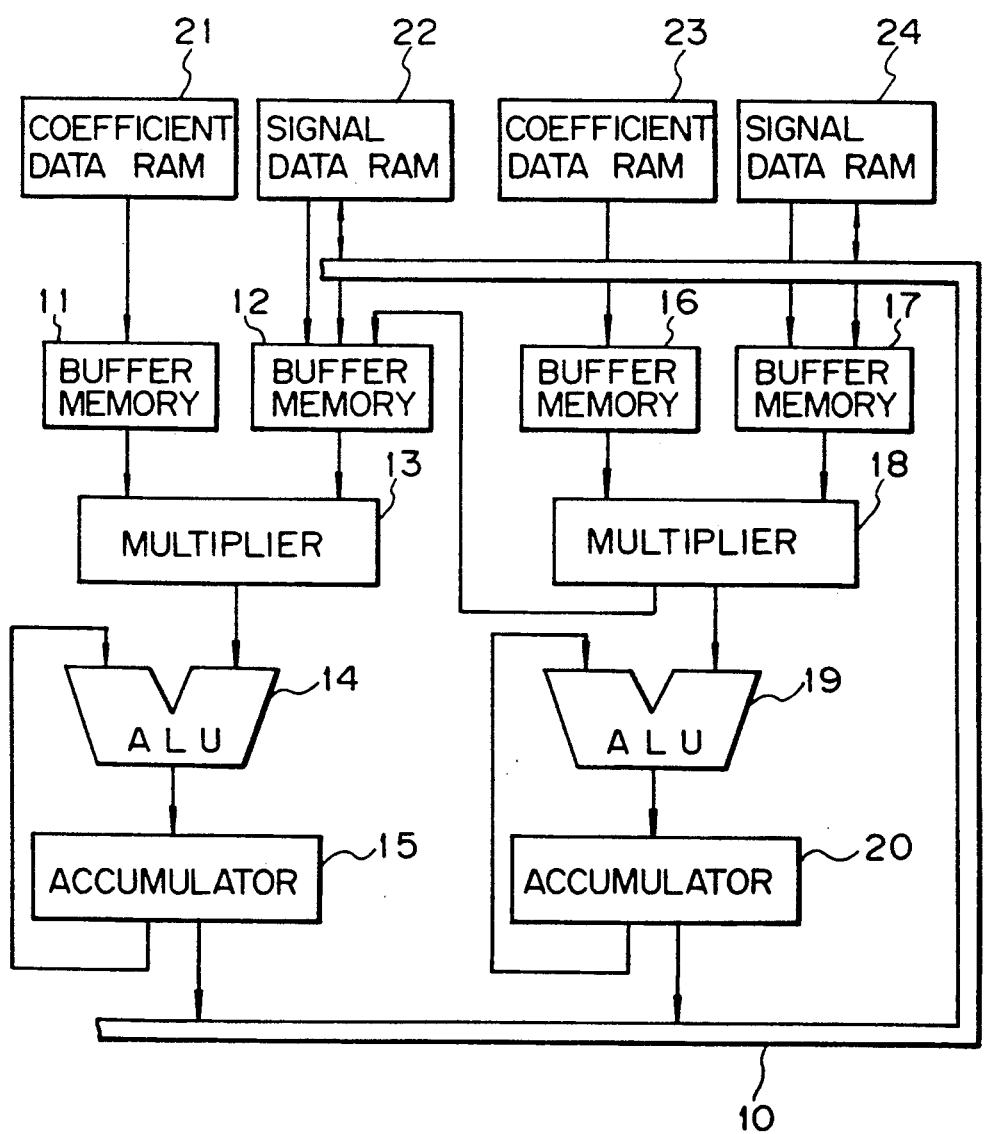
FIG. 2 is a block diagram showing an embodiment of the present invention.

A DSP according to the present invention shown in FIG. 2 has two arithmetic operating sections. The first arithmetic operating section comprises: buffer memories 11 and 12; a multiplier 13; an ALU 14; and an accumulator 15. Outputs of the buffer memories 11 and 12 are connected to the multiplier 13, respectively. An output of the multiplier 13 is connected to one input of the ALU 14. An output of the ALU 14 is connected to the accumulator 15. The accumulator 15 has two outputs and one of the outputs is connected to the other input of the ALU 14 and the other output is connected to a bus 10. The buffer memory 12 has three inputs.

On the other hand, the second arithmetic operating section comprises buffer memories 16 and 17, a multiplier 18, an ALU 19, and an accumulator 20 and is constructed in a manner similar to the first arithmetic operating section.

However, the multiplier 18 in the second arithmetic operating section has two outputs and one output is connected to one input of the ALU 19 and the other output is connected to one input of the buffer memory 12.

Coefficient data $b_1, b_2, \ldots, b_n$ are stored into a coefficient data RAM 21. An output of the RAM 21 is connected to the buffer memory 11. A signal data RAM 22 is connected to the other input of the buffer memory 12. On the other hand, coefficient data $a_1, a_2, \ldots, a_n$ are stored into a coefficient data RAM 23 and an output of the RAM 23 is connected to the buffer memory 16. A signal data RAM 24 is connected to the buffer memory 17. The signal RAMs 22 and 24 and the buffer memories 12 and 17 are also connected to the bus 10.

For the three inputs of the buffer memory 12, two inputs of the bufer memory 17, two outputs of each of the multiplier 18 and the accumulator 15 and 20, and two outputs of each of the signal data RAMs 22 and 24, either one of them is selectively made effective. They are constructed by a switching circuit comprising, for instance, a plurality of 3-state buffers and the like.

The operations such as reading operations of the coefficient data from the RAMs 21 and 23, reading operations of the signal data from the RAMs 22 and 24, arithmetic calculating operations of the ALUs 14 and 19, output selecting operations of the holding data of the accumulators 15 and 20, output selecting operation of the mulitplier 18, and the like are controlled by a sequence controller (not shown) in the DSP. The sequence controller operates in accordance with programs written in a program memory (not shown) in the DSP.

In the DSP having such a construction, audio signal data $x_n$ supplied from the outside is written into a predetermined area in the signal data RAM 24. In the case of executing an arithmetic operation $$\sum_{n=1}^{n} a_n \cdot b_n \cdot x_n$$

in which two coefficient data values are multiplied to the signal data value and the results of the multiplications are accumulated, first, signal data $x_1$ is read out of the signal data RAM 24 and supplied to the buffer memory 17 in the first step. On the othe hand, the coefficient data $a_1$ is read out of the coefficient data RAM 23 and supplied to the buffer memory 16. Therefore, the multiplier 18 multiplies the values of the signal data $x_1$ and coefficient data $a_1$. The value $x_1 \cdot a_1$ of the result of the multiplication by the multiplier 18 is supplied from the other output to the buffer memory 12 in the second step which is one step after the first step. In the second step, the coefficient data $b_1$ is read out of the coefficient data RAM 21 and supplied to the buffer memory 11. Therefore, the multiplier 13 multiplies $x_1 \cdot a_1$ and the coefficient data value $b_1$. The value $a_1 \cdot b_1 \cdot x_1$ of the multiplication result by the multiplier 13 is held in the accumulator 15 via the ALU 14 in the third step.

In the second step, signal data $x_2$ is read out of the signal data RAM 24 and supplied to the buffer memory 17. On the other hand, the coefficient data $a_2$ is read out of the coefficient data RAM 23 and supplied to the buffer memory 16. Since the signal data and coefficient data are sequentially read out every step, the reading operations of $x_2$ and $a_2$ are executed in the next step of the reading step of $x_1$ and $a_1$. The multiplier 18 multiplies the signal data value $x_2$ and the coefficient data value $a_2$. The value $x_2 \cdot a_2$ of the multiplication result by the multiplier 18 is supplied from the other output of the multiplier 18 to the buffer memory 12 in the third step. In the third step, the coefficinet data $b_2$ is read out of the coefficient data RAM 21 and supplied to the buffer memory 11. Therefore, the multiplier 13 multiplies $x_2 \cdot a_2$ and the coefficient data value $b_2$. The value $a_2 \cdot b_2 \cdot x_2$ of the multiplication result by the multiplier 13 is supplied to the other input of the ALU 14. Synchronousyly with the supply of the value $a_2 \cdot b_2 \cdot x_2$, the data value $a_1 \cdot b_1 \cdot x_1$ held in the accumulator 15 is supplied to one input of the ALU 14. Therefore, in the fourth step, the ALU 14 executes the accumulation of $a_1 \cdot b_1 \cdot x_1 + a_2 \cdot b_2 \cdot x_2$ and the value of the accumulation result is held in the accumulator 15. By repeating the above operations, $$\sum_{n=1}^{n} a_n \cdot b_n \cdot x_n$$

is calculated. For example, when n=6, the value $$\sum_{n=1}^{6} a_n \cdot b_n \cdot x_n$$

of the accumulation result is held in the accumulator 15 in the eighth step. The coefficient data $a_1, a_2, \ldots, a_n$ are sequentially read out of the coefficient data RAM 23 every step from the first step. The coefficient data $b_1, b_2, \ldots, b_n$ are sequentially read out of the coefficient data RAM 21 every step from the second step in accordance with this order.

Although the above embodiment has been described with respect to the calculation of $$\sum_{n=1}^{n} a_n \cdot b_n \cdot x_n,$$

the invention is not limited to such a calculation but can be also applied to the case of other calculations.

Figure 3:
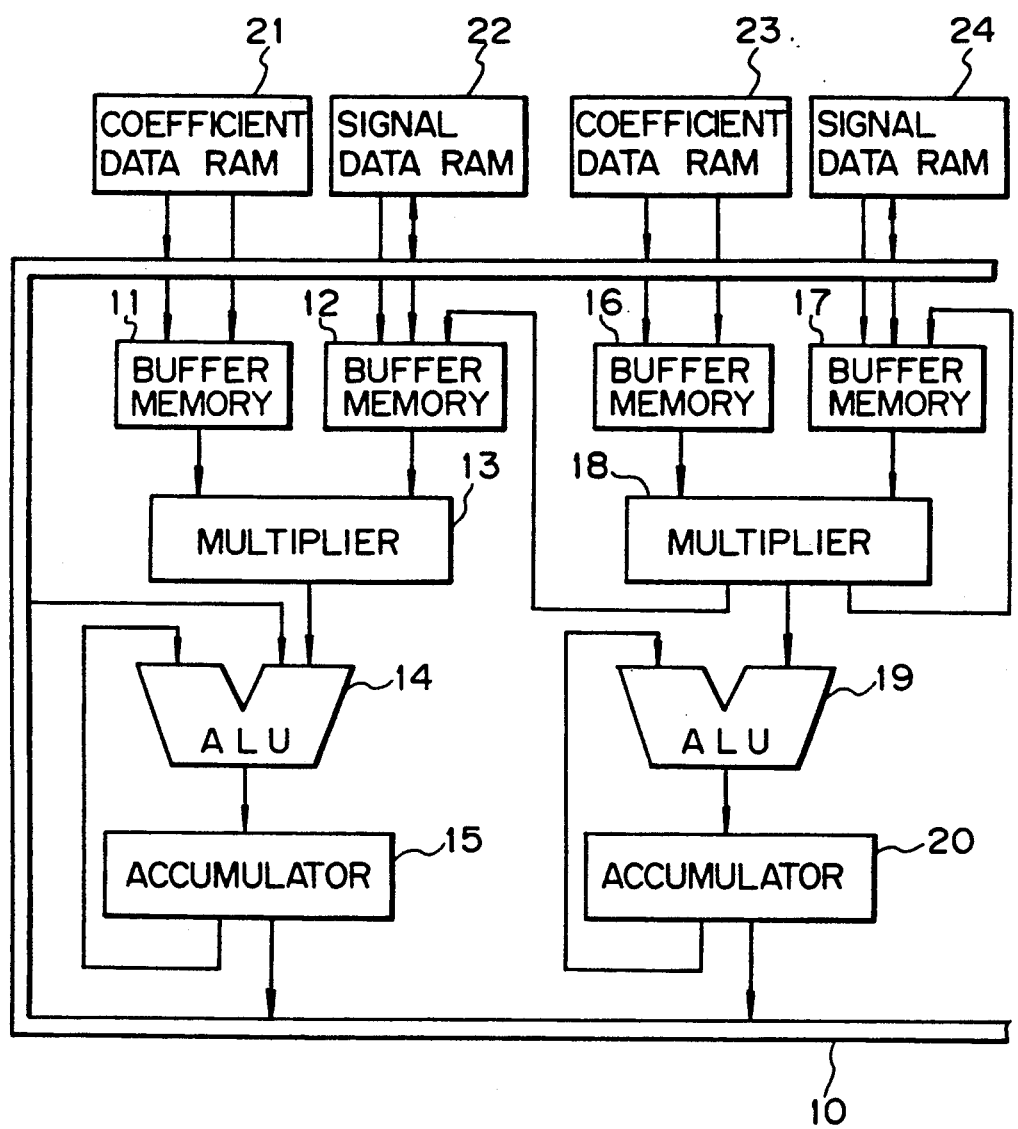
FIG. 3 is a block diagram showing another embodiment of the invention.

FIG. 3 shows another embodiment of the invention. A DSP of FIG. 3 also has two arithmetic operating sections similarly to the DSP shown in FIG. 2. The buffer memory 11 in the first arithmetic operating section has two inputs and one input is connected to the coefficient data RAM 21 and the other input is connected to the bus 10.

On the other hand, the buffer memory 16 in the second arithmetic operating section has two inputs and one input is connected to the coefficient data RAM 23 and the other input is connected to the bus 10. The buffer memory 17 has three inputs and the first input is connected to the signal data RAM 24 and the second input is connected to bus 10. The multiplier 18 in the second arithmetic section has three outputs. The first output is connected to one input of the ALU 19, the second output is connected to the remaining third input of the buffer memory 12, and the third output is connected to the third input of the buffer memory 17.

The coefficient data RAMs 21 and 23 are also connected to the bus 10. The other inputs of the ALU 14 have two inputs. The first input is connected to an output of the multiplier 13 and the second input is connected to the bus 10.

On the other hand, with respect to the three inputs of the buffer memory 12, two inputs of each of the other buffer memories, three outputs of the multiplier 18, two outputs of each of the accumulators 15 and 20, two outputs of each of the RAMs 21 to 24, and the other two inputs of the ALU 14, only either one of them or two or more of them are selectively made effective. For instance, they are constructed by a switching circuit comprising a plurality of 3-state buffers and the like.

The operations such as reading operatinons of the coefficient data from the RAMs 21 and 23, reading operations of the signal data from the RAMs 22 and 24, arithmetic calculating operations of the ALUs 14 and 19, output selecting operations of the holding data of the accumulators 15 and 20, output selecting operation of the multiplier 18, and the like are controlled by a sequence controller (not shown) in the DSP. The sequence controller operates in accordance with programs written in a program memory (not shown) in the DSP.

The other construction is similar to that shown in FIG. 2.

In the DSP having the above construction, when an approximate value calculation of $$\sum_{n=0}^{n} c_n \cdot x^n$$

is executed, the coefficient data values $c_0, c_1, c_2, \ldots, c_n$ are written into the coefficient data RAM 21 before the start of the arithmetic calculating operation. On the other hand, the audio signal data x supplied from the outside is written into the signal data RAM 22.

When the arithmetic calculatiang operation is started, first, the signal data x is read out of the signal data RAM 24 and supplied to the buffer memories 12, 16, and 17 in the first step. On the other hand, the coefficient data $c_1$ is read out of the coefficient data RAM 21 and supplied to the buffer memory 11. Therefore, the multiplier 13 multiplies the values of the signal data x and the coefficient data $a_1$. The value $c_1 \cdot x$ of the multiplication result by the multiplier 13 is supplied and held into the accumulatoar 15 through the ALU 14 in the second step which is one step after the first step. The multiplier 18 executes a square calculation by mutually multiplying the signal data x. The value $x^2$ of the multiplication result by the multiplier 18 is supplied to the buffer memories 12 and 17 in the second step.

In the second step, the coefficient data $c_2$ is read out of the coefficient data RAM 21 and supplied to the buffer memory 11. Therefore, the multiplier 13 multiplies $x^2$ and the coefficient data value $c_2$. The value $c_2 \cdot x^2$ of the multiplication result by the multiplier 13 is supplied to the other first input of the ALU 14. Synchronously with the supply of the value $c_2 \cdot x^2$, the data value $c_1 \cdot x$ held in the accumulataor 15 is supplied to one input of the ALU 14. Therefore, in the third step, the ALU 14 executes an accumulation of $c_1 \cdot x + c_2 \cdot x^2$ and the value of the accumulation result is held in the accumulator 15. On the other hand, the multiplier 18 multiplies the signal data x held in the buffer memory 16 and the signal data $x^2$ held in the buffer memory 17. The value $x^3$ of the multiplication result by the multiplier 18 is supplied to the buffer memories 12 and 17 in the third step.

In the third step, the coefficient data $c_3$ is read out of the coefficient data RAM 21 and supplied to the buffer memory 11. Therefore, the multiplier 13 multiplies $x^3$ and the coefficient data value $c_3$. The value $c_3 \cdot x^3$ of the multiplication result by the multiplier 13 is supplied to the other first input of the ALU 14. Synchronously with the supply of the value $c_3 \cdot x^3$, the accumulation data value $c_1 \cdot x + c_2 \cdot x^2$ held in the accumulator 15 is supplied to one input of the ALU 14. Therefore, in the fourth step, the ALU 14 executes an accumulation of $c_1 \cdot x + c_2 \cdot x^2 + c_3 \cdot x^3$ and the value of the accumulation result is held in the accumulator 15. On the other hand, the multiplier 18 multiplies the signal data x held in the buffer memory 16 and the signal data $x^3$ held in the buffer memory 17. The value $x^4$ of the multiplication result by the multiplier 18 is supplied to the buffer memories 12 and 17 in the fourth step.

By repeating the above operations, $$\sum_{n=1}^{n} c_n \cdot x^n$$

is calculated. In the step after $$\sum_{n=1}^{n} c_n \cdot x^n$$

was held in the accumulator 15, the coefficient data $c_0$ is read out of the coefficient data RAM 21 and supplied to the other second input of the ALU 14. Synchronously with the supply of the coefficient data $c_0$, the accumulation data value $$\sum_{n=1}^{n} c_n \cdot x^n$$

held in the accumulator 15 is supplied to one input of the ALU 14. Therefore, the ALU 14 executes an accumulation of $$c_0 + \sum_{n=1}^{n} c_n \cdot x^n$$

and the value $$\sum_{n=0}^{n} c_n \cdot x^n$$

of the accumulation result is held in the accumulator 15. For instance, when n=4, as shown in FIG. 4, in the sixth step, the value $$\sum_{n=0}^{4} c_n \cdot x^n$$

of the accumulation result is held in the accumulator 15 and obtained. The coefficient data $c_1, c_2, \ldots, c_n, c_0$ are sequentially read out of the coefficient data RAM 21 every step in accordance with this order.

In the above embodiment, the calculation of $$\sum_{n=0}^{n} c_n \cdot x^n$$

has been shown as an approximate value calculation. However, the invention is not limited to such a calculation but can be also applied to the case of other approximate value calculations.

As mentioned above, in the DSP according to the invention, there are provided the first and second arithmetic operating sections each comprising: the digital multiplying means for multiplying the values of two digital signal data; and the digital accumulating means for accumulating the output value of the multiplying means, wherein the output of the multiplying means in the second arithmetic operating section is connected to one input of the digital signal data of the multiplying means in the first arithmetic operating section. Therefore, in the case of an arithmetic operation such that a plurality of coefficients are multiplied to the signal data value like $$\sum_{n=1}^{n} a_n \cdot b_n \cdot x_n,$$

there is no need to transfer the part-way resultant data from the output of the accumulating means to the multiplying means through the bus in the way of the calculation. In addition, the data processes can be efficiently executed because the signal data or coefficient data as digital signal data is read out of the memory every step. Thus, the number of steps of the program can be reduced as compared with the conventional one. Therefore, the processing time can be reduced.

On the other hand, in the DSP according to the invention, there are provided the first and second arithmetic operating sections each comprising the digital multiplying means for multiplying the values of two digital signal data and the digital accumulating means for accumulating the output value of the multiplying means, wherein the output of the multiplying means in the second arithmetic operating section is connected to one input of each of both of the multiplying means in the first and second arithmetic operating sections. Therefore, in the case of executing an approximate value calculation such as $$\sum_{n=0}^{n} c_n \cdot x^n$$

by the DSP, there is no need to transfer the part-way resultant data from the output of the accumulating means to the multiplying means through the bus in the way of the calculation. Thus, the data processes can be efficiently performed because the signal data and the coefficient data are read out of the memory every step. Therefore, the number of steps of the program can be reduced than the conventional one. Consequently, the processing time can be reduced.

What is claimed is:

1. A digital signal processor comprising:
   first and second arithmetic operating sections each including two buffer memories for holding supplied digital signal data respectively, digital multiplying means for multiplying values of two digital signal data respectively held in said two buffer memories, and digital accumulating means for accumulating an output value of said multiplying means;
   wherein one buffer memory in said first arithmetic operating section is connected to an output of the multiplying means in said second arithmetic operating section in order for said one buffer memory to hold a multiplication result of the second arithmetic operating section multiplying means.

2. A digital signal processor comprising:
   first and second arithmetic operating sections each including two buffer memories for holding supplied digital signal data respectively, digital multiplying means for multiplying values of two digital signal data respectively held in said two buffer memories, and digital accumulating means for accumulating an output value of said multiplying means;

wherein respective one buffer memories in said first and second arithmetic operating sections are connected to an output of the multiplying means in said second arithmetic operating section in order for said respective one buffer memories to hold a multiplication result of the second arithmetic operating section multiplying means.

* * * * *